US012784233B2

(12) United States Patent
Ebata

(10) Patent No.: US 12,784,233 B2
(45) Date of Patent: Nov. 3, 2026

(54) IMAGE PROCESSING APPARATUS AND IMAGE PROCESSING METHOD

(71) Applicant: CANON KABUSHIKI KAISHA, Tokyo (JP)

(72) Inventor: Yuya Ebata, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 218 days.

(21) Appl. No.: 18/680,224

(22) Filed: May 31, 2024

(65) Prior Publication Data

US 2024/0320839 A1 Sep. 26, 2024

Related U.S. Application Data

(63) Continuation of application No. PCT/JP2022/043291, filed on Nov. 24, 2022.

(30) Foreign Application Priority Data

Dec. 10, 2021 (JP) ................................ 2021-200668

(51) Int. Cl.
*G06T 7/20* (2017.01)
*G06V 10/60* (2022.01)

(52) U.S. Cl.
CPC ................ *G06T 7/20* (2013.01); *G06V 10/60* (2022.01)

(58) Field of Classification Search
CPC ........... G06T 7/248; G06T 2207/10016; G06T 7/246; G06T 7/20; G06T 2207/30196; G06T 5/50; G06T 5/73; G06T 7/254; G06T 2207/10024; G06T 2207/20021; G06T 2207/20072; G06T 2207/20201; G06T 2207/20224; G06T 5/40; G06T 2207/20221; G06T 2207/30236; G06T 2207/30242; G06T 2207/30252; G06T 7/231; G06T 2207/20192; G06T 2207/30201; G06T 2207/30221; G06T 2207/30232; G06T 7/11; G06T 2207/20024; G06T 2207/20044; G06T 2207/20101; G06T 2207/20104;
(Continued)

(56) References Cited

U.S. PATENT DOCUMENTS

2011/0188758 A1* 8/2011 Kinoshita ............... G06T 7/246 382/195
2016/0155239 A1* 6/2016 Aragaki ............. G01N 15/1433 382/103

FOREIGN PATENT DOCUMENTS

JP 2675807 * 11/1997 ............. H04N 5/232
JP 2011086163 A 4/2011

(Continued)

*Primary Examiner* — Zhiyu Lu
(74) *Attorney, Agent, or Firm* — Canon U.S.A., Inc. IP Division

(57) ABSTRACT

An image processing apparatus includes a first tracking unit configured to perform subject tracking using an image obtained by an image capturing unit, a second tracking unit configured to perform subject tracking using the image obtained by the image capturing unit, an operational load in the second tracking unit being smaller than an operational load in the first tracking unit, and a control unit configured to control switching between enabling both the first tracking unit and the second tracking unit and disabling one of the first tracking unit and the second tracking unit based on brightness of the image obtained by the image capturing unit.

4 Claims, 8 Drawing Sheets

(58) Field of Classification Search
CPC ......... G06T 2207/30204; G06T 3/4007; G06T 5/20; G06T 7/187; G06T 7/215; G06T 7/277; G06T 7/55; G06T 7/60; G06T 7/70; G06V 20/52; G06V 10/25; G06V 10/62; G06V 10/758; G06V 10/761; G06V 10/255; G06V 40/103; G06V 40/161; G06V 40/167; G06V 10/40; G06V 40/10; G06V 40/173; G06V 40/23; G06V 40/28; H04N 23/61; H04N 23/60; H04N 23/683; H04N 23/611; H04N 23/635; H04N 5/144; H04N 23/6811; H04N 23/6812; H04N 23/80; H04N 23/54; H04N 2201/0084; H04N 23/62; H04N 23/631; H04N 23/632; H04N 23/634; H04N 23/64; H04N 23/672; H04N 23/673; H04N 23/68; H04N 23/684; H04N 23/95; H04N 5/145; H04N 7/181; G01S 3/7865; G01S 11/12; G01S 17/66; G01S 3/7864; G08G 1/04; G06F 9/3004; G06F 18/23; G06F 18/295; G06F 2218/12; G06F 3/017; B64D 47/08; G01B 11/002; G01B 11/022; G03B 5/00; G05D 1/042; G05D 1/24

See application file for complete search history.

(56) References Cited

FOREIGN PATENT DOCUMENTS

| | | |
|---|---|---|
| JP | 2017156886 A | 9/2017 |
| JP | 2021501933 A | 1/2021 |

* cited by examiner

FIG.6A

| SUBJECT / BACKGROUND | PERSON | | OBJECT OTHER THAN PERSON | | PANNING |
|---|---|---|---|---|---|
| | NON-MOVING OBJECT | MOVING OBJECT | NON-MOVING OBJECT | MOVING OBJECT | |
| LIGHT | OPERATION MODE 1 | OPERATION MODE 3 | OPERATION MODE 1 | OPERATION MODE 6 | OPERATION MODE 1 |
| BLUE SKY/ EVENING VIEW | OPERATION MODE 2 | OPERATION MODE 4 | OPERATION MODE 2 | OPERATION MODE 7 | OPERATION MODE 1 |
| DARK | OPERATION MODE 1 | OPERATION MODE 5 | OPERATION MODE 1 | OPERATION MODE 8 | OPERATION MODE 1 |

FIG.6B

| OPERATION MODE | DL TRACKING | NON-DL TRACKING | DETECTION |
|---|---|---|---|
| OPERATION MODE 1 | DISABLE | ENABLE | PERSON (OPERATION CYCLE LOW)<br>OBJECT OTHER THAN PERSON (OPERATION CYCLE LOW) |
| OPERATION MODE 2 | DISABLE | ENABLE | PERSON (OPERATION CYCLE LOW)<br>OBJECT OTHER THAN PERSON (OPERATION CYCLE LOW)<br>NON-MOVING OBJECT (OPERATION CYCLE LOW) |
| OPERATION MODE 3 | ENABLE | ENABLE | PERSON (OPERATION CYCLE HIGH)<br>OBJECT OTHER THAN PERSON (OPERATION CYCLE LOW) |
| OPERATION MODE 4 | ENABLE | ENABLE | PERSON (OPERATION CYCLE HIGH)<br>OBJECT OTHER THAN PERSON (OPERATION CYCLE LOW)<br>NON-MOVING OBJECT (OPERATION CYCLE LOW) |
| OPERATION MODE 5 | DISABLE | ENABLE | PERSON (OPERATION CYCLE HIGH)<br>OBJECT OTHER THAN PERSON (OPERATION CYCLE LOW) |
| OPERATION MODE 6 | ENABLE | ENABLE | PERSON (OPERATION CYCLE LOW)<br>OBJECT OTHER THAN PERSON (OPERATION CYCLE HIGH) |
| OPERATION MODE 7 | ENABLE | ENABLE | PERSON (OPERATION CYCLE LOW)<br>OBJECT OTHER THAN PERSON (OPERATION CYCLE HIGH)<br>NON-MOVING OBJECT (OPERATION CYCLE LOW) |
| OPERATION MODE 8 | DISABLE | ENABLE | PERSON (OPERATION CYCLE LOW)<br>OBJECT OTHER THAN PERSON (OPERATION CYCLE HIGH) |

IMAGE PROCESSING APPARATUS AND IMAGE PROCESSING METHOD

CROSS-REFERENCE TO RELATED APPLICATIONS

This application is a Continuation of International Patent Application No. PCT/JP2022/043291, filed Nov. 24, 2022, which claims the benefit of Japanese Patent Application No. 2021-200668, filed Dec. 10, 2021, both of which are hereby incorporated by reference herein in their entirety.

BACKGROUND OF THE INVENTION

Field of the Invention

The present invention relates to an image processing apparatus with respect to subject tracking processing, and an image processing method.

Background Art

Some image capturing apparatuses, such as digital cameras, have a function for tracking a feature area (subject tracking function) by applying a detection of a feature area, such as a face area, over time. An apparatus for tracking a subject using a trained neural network is also known (Japanese Patent Application Laid-Open No. 2017-156886).

CITATION LIST

Patent Literature

PTL 1: Japanese Patent Application Laid-Open No. 2017-156886

The use of machine learning (neural network, deep learning) in a technique of performing subject recognition or subject tracking using an image can enhance the accuracy of subject tracking compared to the use of correlation or similarity between image areas. However, processing using a neural network involves a large calculation amount, and thus requires a high-speed processor and a large-scale circuit, which leads to a large amount of power consumption. For example, when subject tracking using a neural network is applied to a moving image for live view display, there is an issue of draining a battery due to the live view display. Further, with regard to subject tracking using a circuit of a model trained by machine learning, there may be differences in operational load and power consumption depending on a learning model to be used.

The present invention has been made in view of the issue described above, and is directed to providing an image processing apparatus and an image processing method including a subject tracking function to achieve an excellent performance and to suppress power consumption.

SUMMARY OF THE INVENTION

According to an aspect of the present invention, an image processing apparatus includes a first tracking unit configured to perform subject tracking using an image obtained by an image capturing unit, a second tracking unit configured to perform subject tracking using the image obtained by the image capturing unit, an operational load in the second tracking unit being smaller than an operational load in the first tracking unit, and a control unit configured to control switching between enabling both the first tracking unit and the second tracking unit and disabling one of the first tracking unit and the second tracking unit based on brightness of the image obtained by the image capturing unit.

Further features of the present invention will become apparent from the following description of exemplary embodiments with reference to the attached drawings.

BRIEF DESCRIPTION OF THE DRAWINGS

FIG. 6A is a table illustrating operation modes of a detection unit and a tracking unit according to the second exemplary embodiment.

FIG. 6B is a table illustrating the operation modes of the detection unit and the tracking unit according to the second exemplary embodiment.

DESCRIPTION OF THE EMBODIMENTS

Figure 1:
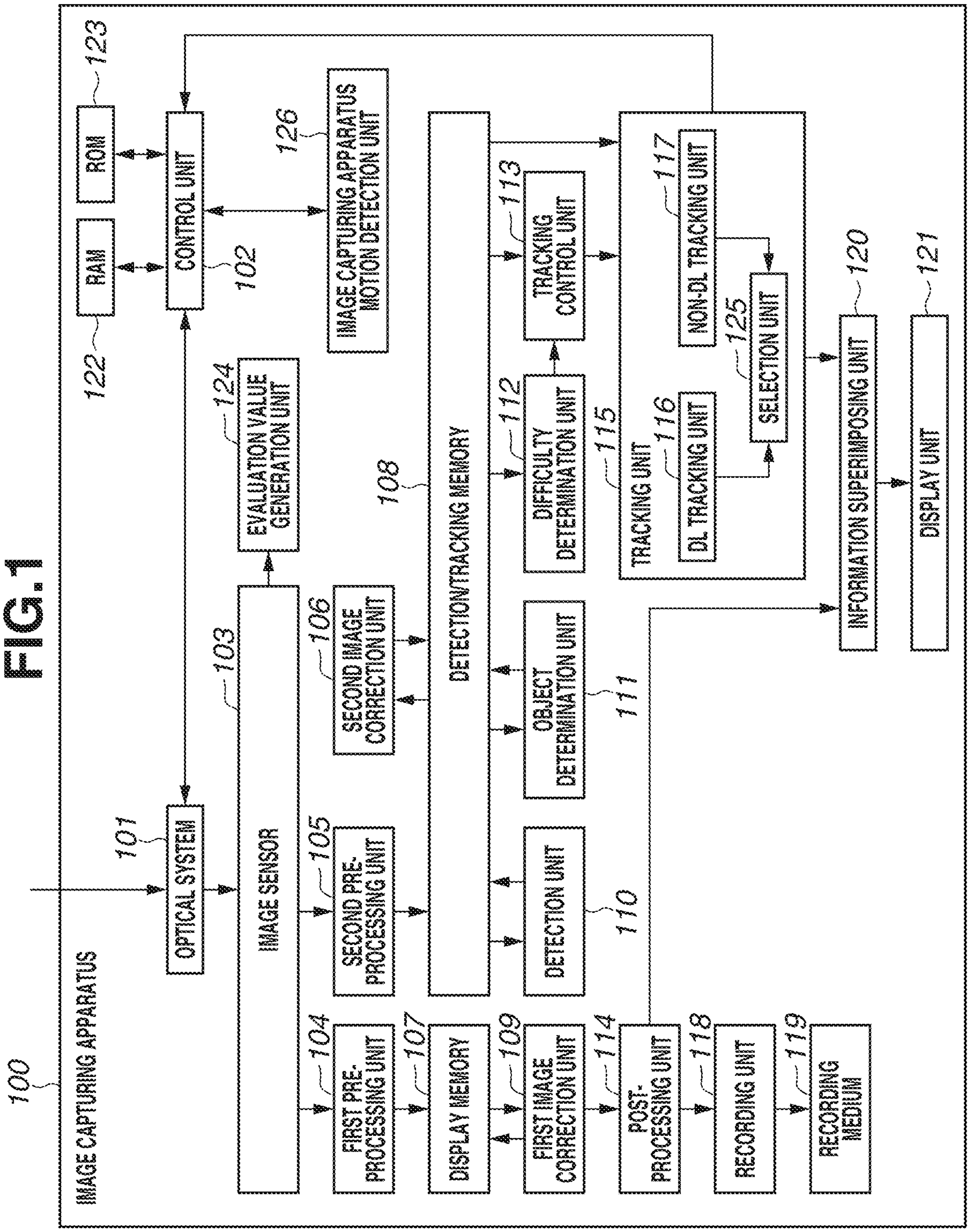
FIG. 1 is a block diagram illustrating a functional configuration example of an image capturing apparatus according to a first exemplary embodiment.

Preferred exemplary embodiments of the present invention will be described below with reference to the attached drawings.

First Exemplary Embodiment

Exemplary embodiments of the present invention will be described in detail below with reference to the attached drawings. The following exemplary embodiments are not intended to limit the claimed invention. While multiple features are described in the exemplary embodiments, not all of the features are essential to the invention, and the multiple features may be combined as appropriate. Further, in the attached drawings, the same reference numerals are given to identical or similar configurations, and redundant description thereof is omitted.

In the following exemplary embodiments, a case where the present invention is carried out using an image capturing apparatus, such as a digital camera, will be described. However, the present invention can also be carried out using any electronic apparatus having an image capturing function. Examples of such an electronic apparatus include a computer apparatus (personal computer, tablet computer, media player, personal digital assistant (PDA), etc.), a mobile phone, a smartphone, a game console, a robot, a drone, and a dashboard camera. These are merely examples, and the present invention can also be carried out using any other electronic apparatus.

FIG. 1 is a block diagram illustrating a functional configuration example of an image capturing apparatus 100 as an example of an image processing apparatus according to a first exemplary embodiment.

An optical system 101 includes a plurality of lenses including a movable lens, such as a focus lens, and forms an optical image of an image capturing range on an image forming plane of an image sensor 103.

A control unit 102 includes a central processing unit (CPU), and loads, for example, a program stored in a read-only memory (ROM) 123 into a random access memory (RAM) 122 and executes the program. The control unit 102 controls operations of functional blocks, thereby implementing functions of the image capturing apparatus 100. The ROM 123 is, for example, a rewritable nonvolatile memory, and stores programs that can be executed by the CPU of the control unit 102, setting values, graphical user interface (GUI) data, and the like. The RAM 122 is a system memory used to load the program to be executed by the CPU of the control unit 102 and to store values necessary during execution of the program. Although not illustrated in FIG. 1, the control unit 102 is communicably connected with the functional blocks.

The image sensor 103 may be, for example, a complementary metal-oxide semiconductor (CMOS) image sensor including primary-color color filters in a Bayer array. The image sensor 103 includes a plurality of pixels each including a photoelectric conversion area that is two-dimensionally arranged. The image sensor 103 converts an optical image formed by the optical system 101 into an electric signal group (analog image signal) by the plurality of pixels. An analog-to-digital (A/D) converter included in the image sensor 103 converts the analog image signal into a digital image signal (image data) and outputs the digital image signal. The A/D converter may be provided on the outside of the image sensor 103.

An evaluation value generation unit 124 generates signals and evaluation values to be used for auto focus (AF) detection and calculates evaluation values to be used for auto exposure (AE) control, based on the image data obtained from the image sensor 103. The evaluation value generation unit 124 outputs the generated signals and evaluation values to the control unit 102. The control unit 102 controls a focus lens position of the optical system 101 and determines image capturing conditions (exposure time, aperture value, International Organization for Standardization (ISO) sensitivity, etc.), based on the signals and evaluation values obtained from the evaluation value generation unit 124. The evaluation value generation unit 124 may generate the signals and evaluation values based on display image data generated by a post-processing unit 114 to be described below.

A first pre-processing unit 104 applies color interpolation processing to the image data obtained from the image sensor 103. The color interpolation processing is also referred to as demosaicing or the like, and refers to processing for causing each piece of pixel data constituting the image data to have a red (R)-component value, a green (G)-component value, and a blue (B)-component value. Further, the first pre-processing unit 104 may apply reduction processing for reducing the number of pixels as necessary. The first pre-processing unit 104 stores the image data obtained by applying the processing in a display memory 107.

A first image correction unit 109 applies correction processing such as white balance correction processing and shading correction processing, conversion processing from an RGB format to a YUV format, and the like to the image data stored in the display memory 107. In the case of applying the correction processing, the first image correction unit 109 may use image data for one or more frames different from a processing target frame among pieces of image data stored in the display memory 107. The first image correction unit 109 can use, for example, image data for a frame(s) before and/or after the processing target frame in chronological order for the correction processing. The first image correction unit 109 outputs the image data to which the processing has been applied to the post-processing unit 114.

The post-processing unit 114 generates recording image data and display image data from the image data supplied from the first image correction unit 109. The post-processing unit 114 applies, for example, encoding processing to the image data, and generates a data file storing the encoded image data as the recording image data. The post-processing unit 114 supplies the recording image data to a recording unit 118.

Further, the post-processing unit 114 generates the display image data to be displayed on a display unit 121 from the image data supplied from the first image correction unit 109. The display image data has a size corresponding to a display size on the display unit 121. The post-processing unit 114 supplies the display image data to an information superimposing unit 120.

The recording unit 118 records the recording image data converted by the post-processing unit 114 on a recording medium 119. The recording medium 119 may be, for example, a semiconductor memory card or a built-in nonvolatile memory.

A second pre-processing unit 105 applies color interpolation processing to the image data output from the image sensor 103. The second pre-processing unit 105 stores the image data to which the processing has been applied in a detection/tracking memory 108. The detection/tracking memory 108 and the display memory 107 may be implemented as spaces with different addresses in the same memory space. The second pre-processing unit 105 may apply reduction processing to reduce the number of pixels as necessary to reduce a processing load. Here, the first pre-processing unit 104 and the second pre-processing unit 105 are described as separate functional blocks, but instead may be configured as a common pre-processing unit.

A second image correction unit 106 applies correction processing such as white balance correction processing and shading correction processing, conversion processing from an RGB format into a YUV format, and the like to the image data stored in the detection/tracking memory 108. The second image correction unit 106 may apply image processing suitable for subject detection processing to the image data. For example, if a representative luminance (e.g., an average luminance for all pixels) for the image data is less than or equal to a predetermined threshold, the second image correction unit 106 may multiply the entire image data by a certain coefficient (gain) so that the representative luminance has a value that is more than or equal to the threshold.

In the case of applying the correction processing, the second image correction unit 106 may use image data for one or more frames different from the processing target frame among pieces of image data stored in the detection/tracking memory 108. The second image correction unit 106 can use, for example, image data for a frame(s) before and/or after the processing target frame in chronological order for the correction processing. The second image correction unit 106 stores the image data to which the processing has been applied in the detection/tracking memory 108.

Functional blocks associated with a subject tracking function, such as the second pre-processing unit 105 and the second image correction unit 106, need not necessarily operate when the subject tracking function is not implemented. The image data to which the subject tracking function is applied is moving image data captured for live view display or moving image data captured for recording. The moving image data has a predetermined frame rate, such as 30 fps, 60 fps, and 120 fps.

A detection unit 110 detects one or more predetermined candidate subject areas (candidate areas) from image data corresponding to one frame. The detection unit 110 associates an object class, indicating a position and a size of an area within the frame and the type of candidate subject (automobile, aircraft, bird, insect, human, head, pupil, cat, dog, etc.), with a degree of reliability thereof for each detected area. Further, the detection unit 110 counts the number of detected areas for each object class.

The detection unit 110 can detect the candidate areas using a known technique for detecting a feature area, such as a face area of a person or an animal. For example, the detection unit 110 may be configured as a class discriminator trained using training data. A discrimination (classification) algorithm is not particularly limited. The detection unit 110 can be implemented by training the discriminator to which a multi-class logistic regression, a support vector machine, a random forest, a neural network, or the like is implemented. The detection unit 110 stores a detection result in the detection/tracking memory 108.

An object determination unit 111 determines a tracking target subject area (main subject area) from the candidate areas detected by the detection unit 110. The tracking target subject area can be determined based on, for example, a priority given in advance to each item included in the detection result, such as the object class and the size of an area. Specifically, the sum of priorities is calculated for each candidate area. A candidate area with the minimum sum may be determined to be the tracking target subject area. Alternatively, a candidate area closest to the center of an image, a candidate area closest to a focus detection area, or the largest candidate area among candidate areas belonging to a specific object class may be determined to be the tracking target subject area. The object determination unit 111 stores information that identifies the determined subject area in the detection/tracking memory 108.

A difficulty determination unit 112 calculates a difficulty score that is an evaluation value indicating difficulty of tracking for the tracking target subject area determined by the object determination unit 111. For example, the difficulty determination unit 112 can calculate the difficulty score in consideration of one or more elements that affect the difficulty of tracking. Examples of elements that affect the difficulty of tracking include the size of a subject area, the object class (type) of a subject, the total number of areas belonging to the same object class, and a position thereof within an image. However, the elements are not limited to these examples. A specific example of a difficulty score calculation method will be described below. The difficulty determination unit 112 outputs the calculated difficulty score to a tracking control unit 113.

The tracking control unit 113 determines whether to enable or disable each of a plurality of tracking units included in a tracking unit 115 based on the difficulty score calculated by the difficulty determination unit 112. In the present exemplary embodiment, the tracking unit 115 includes the plurality of tracking units with different operational loads and tracking accuracies. Specifically, the tracking unit 115 includes a deep learning (DL) tracking unit 116 for performing subject tracking using DL and a non-DL tracking unit 117 for performing subject tracking without using DL. A case is cited where processing accuracy of the DL tracking unit 116 is higher than the processing accuracy of the non-DL tracking unit 117, while the operational load in the DL tracking unit 116 is larger than the operational load in the non-DL tracking unit 117.

In this case, the tracking control unit 113 determines whether to enable or disable each of the DL tracking unit 116 and the non-DL tracking unit 117. The tracking control unit 113 also determines an operation frequency of the tracking unit to be enabled. The operation frequency refers to a frequency (frames per second (fps)) at which tracking processing is applied.

The tracking unit 115 estimates the tracking target subject area from image data for the processing target frame (current frame) stored in the detection/tracking memory 108, and obtains the position and size of the estimated subject area within the frame as a tracking result. The tracking unit 115 estimates the tracking target subject area within the current frame using, for example, image data for the current frame and image data for a previous frame (e.g., a preceding frame) captured before the current frame. The tracking unit 115 outputs the tracking result to the information superimposing unit 120.

Here, the tracking unit 115 estimates an area within the processing target frame corresponding to the tracking target subject area in the previous frame. In other words, the tracking target subject area determined by the object determination unit 111 for the processing target frame is not the tracking target subject area in tracking processing performed on the processing target frame. The tracking target subject area in the tracking processing performed on the processing target frame is the tracking target subject area in the previous frame. The tracking target subject area determined by the object determination unit 111 for the processing target frame is used for the tracking processing performed on the next frame when a tracking target subject is switched to another subject.

The tracking unit 115 includes the DL tracking unit 116 for performing subject tracking using DL, and the non-DL tracking unit 117 for performing subject tracking without using DL. The tracking unit enabled by the tracking control unit 113 outputs the tracking result at the operation frequency set by the tracking control unit 113.

The DL tracking unit 116 estimates the position and size of the tracking target subject area using a trained multi-layer neural network including a convolution layer. Specifically, the DL tracking unit 116 includes a function of extracting feature points of a subject area for each possible target object class and a feature amount included in each feature point, and a function of associating the extracted feature points between frames. Thus, the DL tracking unit 116 can estimate the position and size of the tracking target subject area in the current frame based on the feature points in the current frame associated with the feature points of the tracking target subject area in the previous frame.

The DL tracking unit 116 outputs the position, the size, and a reliability score of the tracking target subject area estimated for the current frame. The reliability score indicates reliability of associating feature points between frames, i.e., the reliability of an estimation result of the tracking target subject area. A reliability score indicating that the reliability of associating feature points between frames is low indicates that there is a possibility that the subject area estimated for the current frame may be an area relating to a subject different from the tracking target subject area in the previous frame.

On the other hand, the non-DL tracking unit 117 estimates the tracking target subject area in the current frame by a method that does not use DL. Herein, a case is cited where the non-DL tracking unit 117 estimates the tracking target subject area based on similarity of color composition. However, any other method, such as pattern matching using the tracking target subject area in the previous frame as a template, may be used. The non-DL tracking unit 117 outputs the position, the size, and the reliability score of the tracking target subject area estimated for the current frame.

Now, the similarity of color composition will be described. For ease of explanation and understanding, it is assumed that the tracking target subject area in the previous frame has the same shape and size as the tracking target subject area in the current frame. Also, it is assumed that image data has a depth of 8 bits (values "0" to "255") for each of RGB color components.

The non-DL tracking unit 117 divides a range of values ("0" to "255") that can be taken by a certain color component (e.g., R-component) into a plurality of areas. Then, the non-DL tracking unit 117 uses a result (frequency for each value range) of classifying pixels included in the tracking target subject area based on areas to which the values of the R-component belong as the color composition of the tracking target subject area.

As a simplest example, the range of values ("0" to "255") that can be taken by the R-component is divided into Red1 ("0" to "127") and Red2 ("128" to "255"). The color composition of the tracking target subject area in the previous frame includes 50 pixels of Red1 and 70 pixels of Red2. The color composition of the tracking target subject area in the current frame includes 45 pixels of Red1 and 75 pixels of Red2.

In this case, the non-DL tracking unit 117 can calculate a score (similarity score) indicating the similarity of color composition as follows based on a difference in the number of pixels classified in the same value range.

$$\text{Similarity Score}=|50-45|+|70-75|=10$$

If the color composition of the tracking target subject area in the current frame includes 10 pixels of Red1 and 110 pixels of Red2, the similarity score is expressed by the following expression.

$$\text{Similarity Score}=|50-10|+|70-110|=80$$

Thus, the similarity score increases as the similarity of color composition decreases. In other words, a lower similarity score indicates a higher similarity of color composition.

The information superimposing unit 120 generates an image of a tracking frame based on the size of the subject area included in the tracking result output by the tracking unit 115. For example, the image of the tracking frame may be a frame-like image indicating an outline of a rectangle circumscribed around the subject area. The information superimposing unit 120 superimposes the image of the tracking frame on the display image data output by the post-processing unit 114 so that the tracking frame is displayed at a position corresponding to the subject area included in the tracking result, thereby generating combined image data. Further, the information superimposing unit 120 may generate images representing current setting values, state, and the like of the image capturing apparatus 100, and may superimpose the images on the display image data output by the post-processing unit 114 so that the images are displayed at a predetermined position. The information superimposing unit 120 outputs the combined image data to the display unit 121.

The display unit 121 may be, for example, a liquid crystal display or an organic electroluminescence (EL) display. The display unit 121 displays images based on the combined image data output by the information superimposing unit 120. A live view display corresponding to one frame is performed in the manner as described above.

The evaluation value generation unit 124 generates the signals and evaluation values to be used for the AF detection and calculates the evaluation values (luminance information) to be used for the AE control, based on the image data obtained from the image sensor 103. The luminance information is generated by color conversion from an integral value (red, blue, green) obtained by integrating pixels of color filters (red, blue, green). Any other method may be used to generate the luminance information. An evaluation value (integral value for each color (red, blue, green)) to be used for automatic white balance (AWB) is calculated by a method similar to the method used to generate the luminance information. The control unit 102 identifies a light source based on the integral values for each color, and calculates a pixel correction value so that a white object is displayed in white. The first image correction unit 109 or the second image correction unit 106 to be described below multiplies each pixel by the correction value, thereby white balance is achieved. Further, motion vectors are calculated from reference image data using two or more pieces of image data as evaluation values (motion vector information) used to detect a camera shake for camera shake correction. The evaluation value generation unit 124 outputs the generated signals and evaluation values to the control unit 102. The control unit 102 controls the focus lens position of the optical system 101 and determines image capturing conditions (exposure time, aperture value, ISO sensitivity, etc.) based on the signals and evaluation values obtained from the evaluation value generation unit 124. The evaluation value generation unit 124 may generate the signals and evaluation values based on the display image data generated by the post-processing unit 114 to be described below.

A selection unit 125 adopts one of the tracking result from the DL tracking unit 116 and the tracking result from the non-DL tracking unit 117 based on the reliability score output by the DL tracking unit 116 and the similarity score output by the non-DL tracking unit 117. For example, if the reliability score is less than or equal to a predetermined reliability score threshold and the similarity score is less than or equal to a predetermined similarity score threshold, the selection unit 125 adopts the tracking result from the non-DL tracking unit 117. In the other cases, the selection unit 125 adopts the tracking result from the DL tracking unit 116. The selection unit 125 outputs the adopted tracking result to the information superimposing unit 120 and the control unit 102. Here, whether to adopt the tracking result from the DL tracking unit 116 or the tracking result from the non-DL tracking unit 117 is determined based on the reliability score and the similarity score. However, the tracking result to be adopted may be determined by any other method. For example, the tracking result from the DL tracking unit 116 may be preferentially adopted based on a fact that the processing accuracy of the DL tracking unit 116 tends to be higher than the processing accuracy of the non-DL tracking unit 117. Specifically, if the tracking result from the DL tracking unit 116 is obtained, the tracking result from the DL tracking unit 116 may be adopted, and if the tracking result from the DL tracking unit 116 is not obtained, the tracking result from the non-DL tracking unit 117 may be adopted.

An image capturing apparatus motion detection unit 126 detects a motion of the image capturing apparatus 100, and is composed of a gyroscope sensor or the like. The image capturing apparatus motion detection unit 126 outputs detected motion information about the image capturing apparatus 100 to the control unit 102. The control unit 102 detects a camera shake and detects panning in a predetermined direction of the image capturing apparatus 100 based on the motion information about the image capturing apparatus 100, and determines whether panning image capturing is performed. In determination of the panning image capturing, the result from the image capturing apparatus motion detection unit 126 and the motion vectors supplied from the evaluation value generation unit 124 are used in combination to determine if the image capturing apparatus 100 is panned in a predetermined direction and almost no motion vectors for the subject are found. This leads to an improvement in accuracy of the determination of the panning image capturing.

Figure 2:
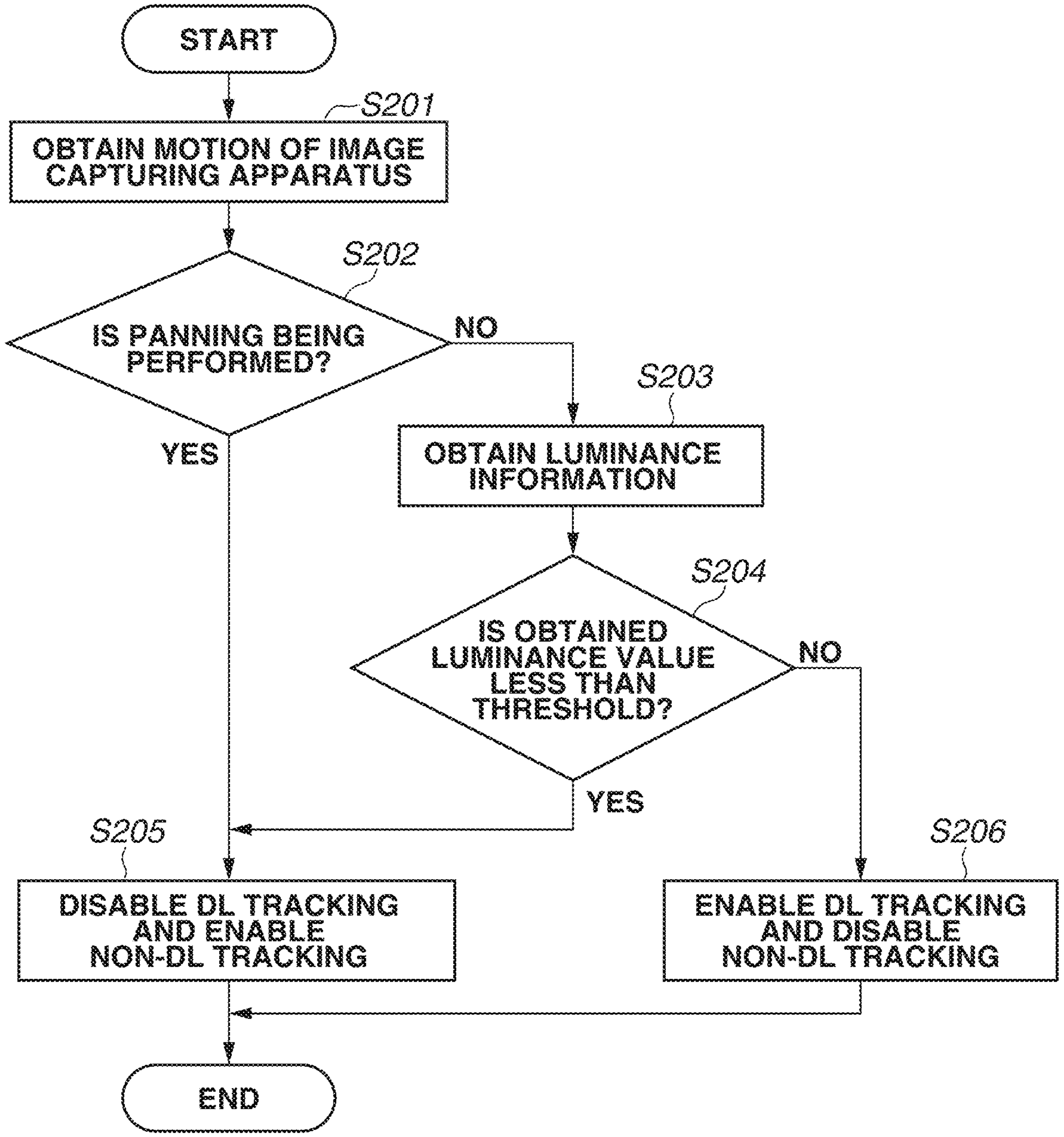
FIG. 2 is a flowchart illustrating an operation flow performed by a tracking control unit in the image capturing apparatus according to the first exemplary embodiment.

Next, an operation flow of subject tracking processing to be performed by the tracking control unit 113 when the image capturing apparatus 100 performs an image capturing operation will be described with reference to FIG. 2. In the present exemplary embodiment, the tracking control unit 113 controls enabling or disabling DL tracking and non-DL tracking depending on whether a scene is a scene for panning image capturing or a scene with a low luminance. However, scene determination may be performed with regard to one of the scene for panning image capturing and the scene with a low luminance. Alternatively, another scene determination may be performed, and then determination on whether to enable or disable the DL tracking and non-DL tracking may be performed.

In step S201, the tracking control unit 113 obtains the motion information about the image capturing apparatus 100 detected by the image capturing apparatus motion detection unit 126, and then the processing proceeds to step S202.

In step S202, the tracking control unit 113 determines whether panning is being performed based on whether a motion in a predetermined direction of the image capturing apparatus 100 is detected based on the motion information about the image capturing apparatus 100. If the tracking control unit 113 determines that panning is being performed (YES in step S202), the processing proceeds to step S205. If the tracking control unit 113 determines that panning is not being performed (NO in step S202), the processing proceeds to step S203.

In step S203, the tracking control unit 113 obtains the luminance information generated by the evaluation value generation unit 124, and then the processing proceeds to step S204.

In step S204, the tracking control unit 113 compares the obtained luminance information (luminance value) with a threshold. If the luminance value is less than the threshold (YES in step S204), the processing proceeds to step S205. If the luminance value is more than or equal to the threshold (NO in step S204), the processing proceeds to step S206. Specifically, if the brightness indicated by the image data is low, the processing proceeds to step S205, and if the brightness indicated by the image data is high, the processing proceeds to step S206. In the present exemplary embodiment, the determination is performed based on luminance information about one frame. Alternatively, it is also possible to configure such that the determination is performed by comparing luminance information about a plurality of frames with the threshold, and if luminance values of the plurality of frames are less than the threshold, the processing proceeds to step S205.

In step S205, the tracking control unit 113 determines to disable the DL tracking unit 116 and to enable the non-DL tracking unit 117, and then terminates the processing. In panning, there is no need for the image capturing apparatus 100 to track a target subject, or a moving subject, because a user moves the image capturing apparatus 100 in a predetermined direction to capture an image of the subject. Accordingly, such a scene may be recognized as a scene that does not require a tracking performance, and the operation frequency of the non-DL tracking unit 117 may be reduced. Similarly, if the brightness indicated by the image data is low, i.e., if it is assumed that a night view is to be captured, such a scene may be recognized as the scene that does not require the tracking performance, and the operation frequency of the non-DL tracking unit 117 may be reduced.

In step S206, the tracking control unit 113 determines to enable the DL tracking unit 116 and to disable the non-DL tracking unit 117, and then terminates the processing.

(Display Processing to be Performed by Display Unit 121)

Figure 3A:
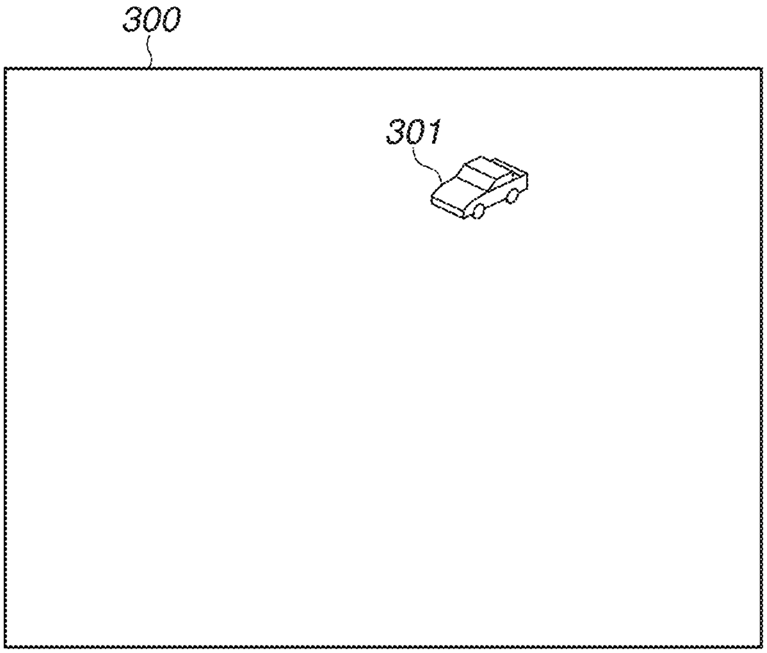
FIG. 3A illustrates a live view display in subject tracking processing according to the first exemplary embodiment.
Figure 3B:
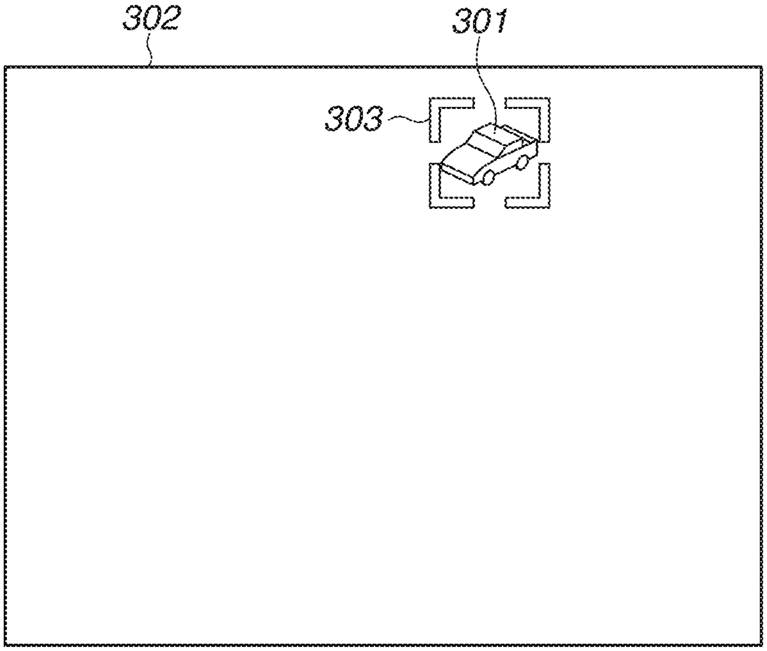
FIG. 3B illustrates a live view display in the subject tracking processing according to the first exemplary embodiment.

FIGS. 3A and 3B each illustrate an example of a live view display. FIG. 3A illustrates an image 300 that is representation of display image data output by the post-processing unit 114. FIG. 3B illustrates an image 302 that is representation of combined image data in which an image of a tracking frame 303 is superimposed on the display image data. In this case, only one candidate subject 301 is present within an image capturing range, and thus the candidate subject 301 is selected as the tracking target subject. The tracking frame 303 is superimposed on the candidate subject 301 such that the tracking frame 303 surrounds the candidate subject 301. In the example illustrated in FIG. 3B, the tracking frame 303 is formed of a combination of four hollow hook shapes, but instead may have any other form. For example, the tracking frame 303 may be formed of a combination of non-hollow hook shapes, a continuous frame, a combination of rectangles, or a combination of triangles. The form of the tracking frame 303 may be selected by the user.

Figure 4:
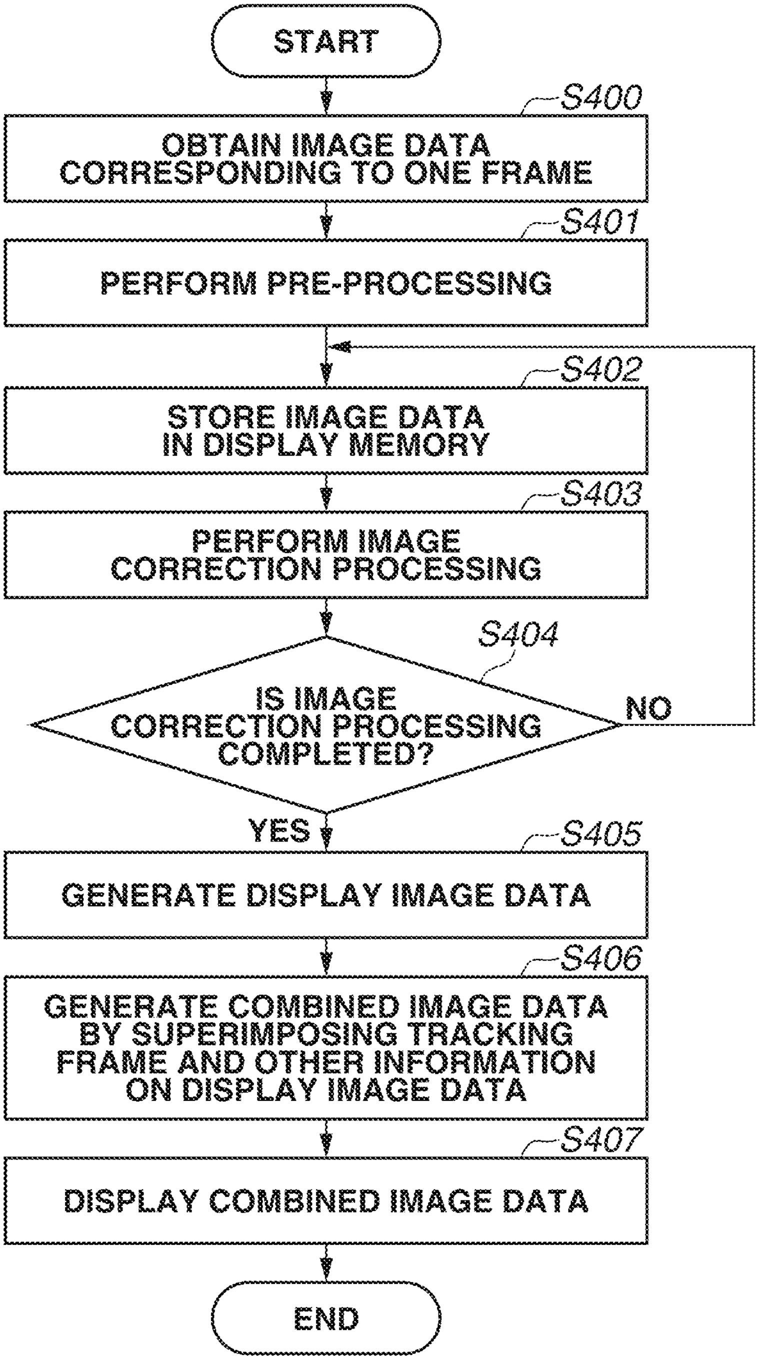
FIG. 4 is a flowchart illustrating an operation of a subject tracking function performed by the image capturing apparatus according to a second exemplary embodiment.

FIG. 4 is a flowchart illustrating an operation of the subject tracking function in a series of image capturing operations performed by the image capturing apparatus 100. Each step is executed by the control unit 102 or each unit according to an instruction from the control unit 102.

In step S400, the control unit 102 controls the image sensor 103 to capture an image corresponding to one frame, and obtains image data.

In step S401, the first pre-processing unit 104 applies pre-processing to image data read from the image sensor 103.

In step S402, the control unit 102 stores the image data to which the pre-processing has been applied in the display memory 107.

In step S403, the first image correction unit 109 starts to apply predetermined image correction processing to image data read from the display memory 107.

In step S404, the control unit 102 determines whether all the image correction processing to be applied is completed. If the control unit 102 determines that all the image correction processing is completed (YES in step S404), the image data to which the image correction processing has been applied is output to the post-processing unit 114, and then the processing proceeds to step S405. If the control unit 102 determines that not all the image correction processing is completed (NO in step S404), the first image correction unit 109 continuously performs the image correction processing.

In step S405, the post-processing unit 114 generates display image data from the image data to which the image correction processing has been applied by the first image correction unit 109, and outputs the generated display image data to the information superimposing unit 120.

In step S406, the information superimposing unit 120 generates combined image data by superimposing images of a tracking frame and other information on a captured image using the display image data generated by the post-processing unit 114, image data on the tracking frame, and image data indicating the other information. The information superimposing unit 120 outputs the combined image data to the display unit 121.

In step S407, the display unit 121 displays the combined image data generated by the information superimposing unit 120. Thus, a live view display corresponding to one frame is completed.

As described above, in the present exemplary embodiment, an image processing apparatus using a first tracking unit and a second tracking unit with a smaller operational load than the operational load in the first tracking unit controls enabling or disabling the first tracking unit and the second tracking unit based on at least one of a motion of the image capturing apparatus 100 and brightness indicated by image data. Accordingly, the first tracking unit is disabled in a scene in which there is less need for obtaining an excellent tracking result so that power consumption can be reduced.

The present exemplary embodiment describes an example where, in the case of controlling enabling or disabling the DL tracking unit 116 and the non-DL tracking unit 117 based on the motion of the image capturing apparatus 100 or the brightness indicated by image data, the control is exclusively performed such that, for example, the non-DL tracking unit 117 is disabled when the DL tracking unit 116 is enabled. However, the present exemplary embodiment is not limited to this example. In a panning scene, which is more difficult to capture, or in a scene with a low luminance value, both the DL tracking unit 116 and the non-DL tracking unit 117 may be enabled based on a panning speed or how low the luminance value is. In other words, the tracking processing may be controlled based on the tracking results from both the DL tracking unit 116 and the non-DL tracking unit 117. The above-described exemplary embodiment describes an example where the control of enabling or disabling the DL tracking unit 116 and the non-DL tracking unit 117 is performed by switching between two values. However, the control is not limited to this example. The control may be performed by switching at multiple levels based on the brightness of an image or the motion of a subject. Specifically, a plurality of levels of an operational load may be prepared in enabling the DL tracking unit 116 and the non-DL tracking unit 117, and the control may be switched to perform processing with a higher operational load if it is more effective.

The present exemplary embodiment describes an example where, when the DL tracking unit 116 and the non-DL tracking unit 117 are disabled, all arithmetic operations to be executed by the DL tracking unit 116 are omitted or are not executed. However, the present exemplary embodiment is not limited to this example. At least a part of tracking calculation processing and tracking result output processing, such as calculations for pre-processing for tracking processing and for main processing for tracking, which are performed when each tracking unit is enabled, may be omitted or may not be executed.

Second Exemplary Embodiment

Next, a second exemplary embodiment of the present invention will be described. Only differences between the second exemplary embodiment and the first exemplary embodiment described above will be described. The same parts are denoted by the same reference numerals, and the detailed descriptions thereof are omitted. In the second exemplary embodiment, an image capturing apparatus 100 controls the DL tracking unit 116, the non-DL tracking unit 117, and the detection unit 110 using a result of automatically recognizing an image capturing scene based on at least one of a captured image, an image capturing parameter, an orientation of the image capturing apparatus 100, and the like. The control will be described below with reference to FIGS. 5, 6A, and 6B.

Figure 5:
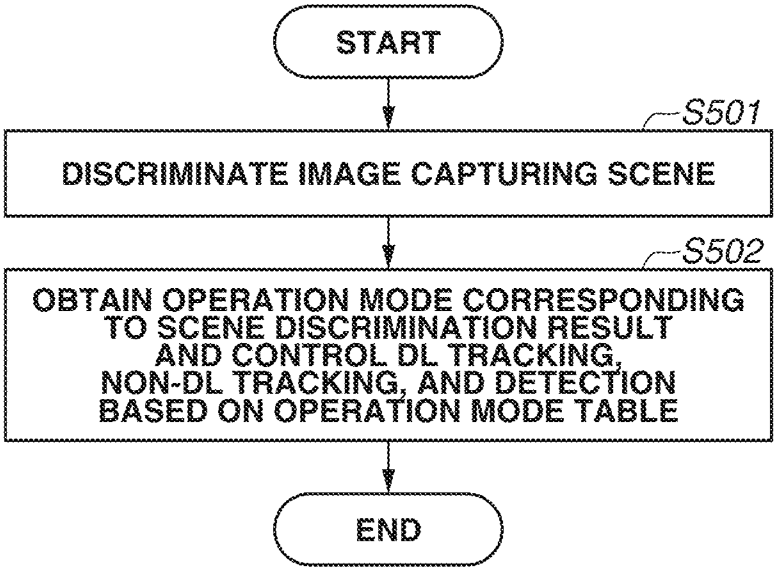
FIG. 5 is a flowchart illustrating an operation flow performed by a control unit according to the second exemplary embodiment.

FIG. 5 is a flowchart illustrating an operation flow performed by a control unit 102 according to the second exemplary embodiment.

In step S501, the control unit 102 discriminates image capturing scenes illustrated in FIG. 6A (to be described below), and then the processing proceeds to step S502. To discriminate the image capturing scenes illustrated in FIG. 6A, whether a background is light or dark is determined based on the luminance information obtained by the evaluation value generation unit 124, and whether the background is a blue sky or an evening view is determined based on light source information obtained in the process of calculating the white balance correction value, and luminance information. Further, it is determined whether the subject is a person or an object other than a person based on the result from the detection unit 110, and the tracking unit 115 determines whether the subject is a moving object or a non-moving object. The determination method is not limited to these methods. Any other method can be applied as long as a known processing sequence is used to determine the image capturing scene based on an image and information obtained by a gyroscope sensor, an infrared sensor, a Time-of-Flight (ToF) sensor, or the like. The determination of panning image capturing is performed by a method similar to the method used in the first exemplary embodiment.

In step S502, the control unit 102 performs control to set operation modes illustrated in FIG. 6B (to be described below) corresponding to the image capturing scene illustrated in FIG. 6A, and terminates the processing. Specifically, the control unit 102 controls the detection unit 110 and issues a notification to the tracking control unit 113 depending on the operation mode in an image capturing scene table illustrated in FIG. 6A. The tracking control unit 113 that has received the notification controls the DL tracking unit 116.

FIG. 6A is a table illustrating a relationship between image capturing scenes and operation modes of the detection unit 110 and the tracking unit 115. Horizontally, items indicating whether the subject is a person or an object other than a person, whether the subject is a moving object or a non-moving object, and whether it is a panning scene or not are indicated. Vertically, items indicating the brightness of the background, and whether the background is a blue sky or an evening view are indicated. In other words, the table illustrated in FIG. 6A is used to determine an operation mode by determining the subject and the background. The image capturing scenes illustrated in FIG. 6A are merely examples. Any other image capturing scene may be added in determining the operation mode.

FIG. 6B is a table illustrating the operation modes of the detection unit 110 and the tracking unit 115.

In Operation Mode 1, the DL tracking unit 116 is disabled, the non-DL tracking unit 117 is enabled, objects to be detected by the detection unit 110 are a person and an object other than a person, and an operation cycle of the detection unit 110 is set to, for example, less than or equal to a half of an image capturing frame rate.

In Operation Mode 2, the DL tracking unit 116 is disabled, the non-DL tracking unit 117 is enabled, the objects to be detected by the detection unit 110 are a person, an object other than a person, and a non-moving object, such as a building, a road, sky, and a tree, and the operation cycle is set to, for example, less than or equal to a half of the image capturing frame rate. A result of recognizing the non-moving object is used to, for example, identify a light source for white balance, or perform image processing and to distinguish an artificial object from a non-artificial object in correction processing to be performed by the first image correction unit 109 and the second image correction unit 106.

In Operation Mode 3, the DL tracking unit 116 is enabled, the non-DL tracking unit 117 is enabled, the objects to be detected by the detection unit 110 are a person and an object other than a person, and the operation cycle is set such that, for example, the operation cycle for the person is set to be equal to the image capturing frame rate and the operation cycle for the object other than a person is set to less than or equal to a half of the image capturing frame rate.

In Operation Mode 4, the DL tracking unit 116 is enabled, the non-DL tracking unit 117 is enabled, the objects to be detected by the detection unit 110 are a person, an object other than a person, and a non-moving object, and the operation cycle is set such that, for example, the operation cycle for the person is set to be equal to the image capturing frame rate and the operation cycle for the object other than a person and the non-moving object is set to less than or equal to a half of the image capturing frame rate.

In Operation Mode 5, the DL tracking unit 116 is disabled, the non-DL tracking unit 117 is enabled, the objects to be detected by the detection unit 110 are a person and an object other than a person, and the operation cycle is set such that, for example, the operation cycle for the person is set to be equal to the image capturing frame rate and the operation cycle for the object other than a person is set to less than or equal to a half of the image capturing frame rate.

In Operation Mode 6, the DL tracking unit 116 is enabled, the non-DL tracking unit 117 is enabled, the objects to be detected by the detection unit 110 are a person and an object other than a person, and the operation cycle is set such that, for example, the operation cycle for the person is set to less than or equal to a half of the image capturing frame rate and the operation cycle for the object other than a person is set to be equal to the image capturing frame rate.

In Operation Mode 7, the DL tracking unit 116 is enabled, the non-DL tracking unit 117 is enabled, the objects to be detected by the detection unit 110 are a person, an object other than a person, and a non-moving object, and the operation cycle is set such that, for example, the operation cycle for the person and the non-moving object is set to less than or equal to a half of the image capturing frame rate and the operation cycle for the object other than a person is set to be equal to the image capturing frame rate.

In Operation Mode 8, the DL tracking unit 116 is disabled, the non-DL tracking unit 117 is enabled, the objects to be detected by the detection unit 110 are a person and an object other than a person, and the operation cycle is set such that, for example, the operation cycle for the person is set to less than or equal to a half of the image capturing frame rate and the operation cycle for the object other than a person is set to be equal to the image capturing frame rate.

The operation modes illustrated in FIG. 6B are examples of operation modes to be set corresponding to the scenes illustrated in FIG. 6A, and the operation modes may be changed. In the present exemplary embodiment, the non-DL tracking unit 117 is used to determine whether the subject is a moving object or a non-moving object in image capturing scene determination. Accordingly, the non-DL tracking unit 117 is enabled in all of the operation modes. Alternatively, the determination as to whether the subject is a moving object or a non-moving object may be performed by monitoring the position of the subject detected by the detection unit 110 in a plurality of frames. In this case, if the subject is a non-moving object (if it is determined that the subject is not a moving object), the non-DL tracking unit 117 may be disabled.

As described above, in the present exemplary embodiment, the image processing apparatus using the first tracking unit and the second tracking unit with a smaller operational load than the operational load in the first tracking unit controls enabling or disabling the first tracking unit and the second tracking unit based on the scene in which the image is captured. Further, the number of objects to be detected by the detection unit 110 from the image is limited, and the operation cycle is changed, based on the scene in which the image is captured. Consequently, power consumption can be suppressed in a scene in which there is less need for obtaining an excellent tracking result.

Third Exemplary Embodiment

Next, a third exemplary embodiment of the present invention will be described. In the third exemplary embodiment, an image processing apparatus that detects what is called "feature points" in a plurality of areas within a captured image controls the DL tracking unit 116, the non-DL tracking unit 117, and the detection unit 110 based on feature point detection results. The control will be described below with reference to FIGS. 7 and 8.

Figure 7:
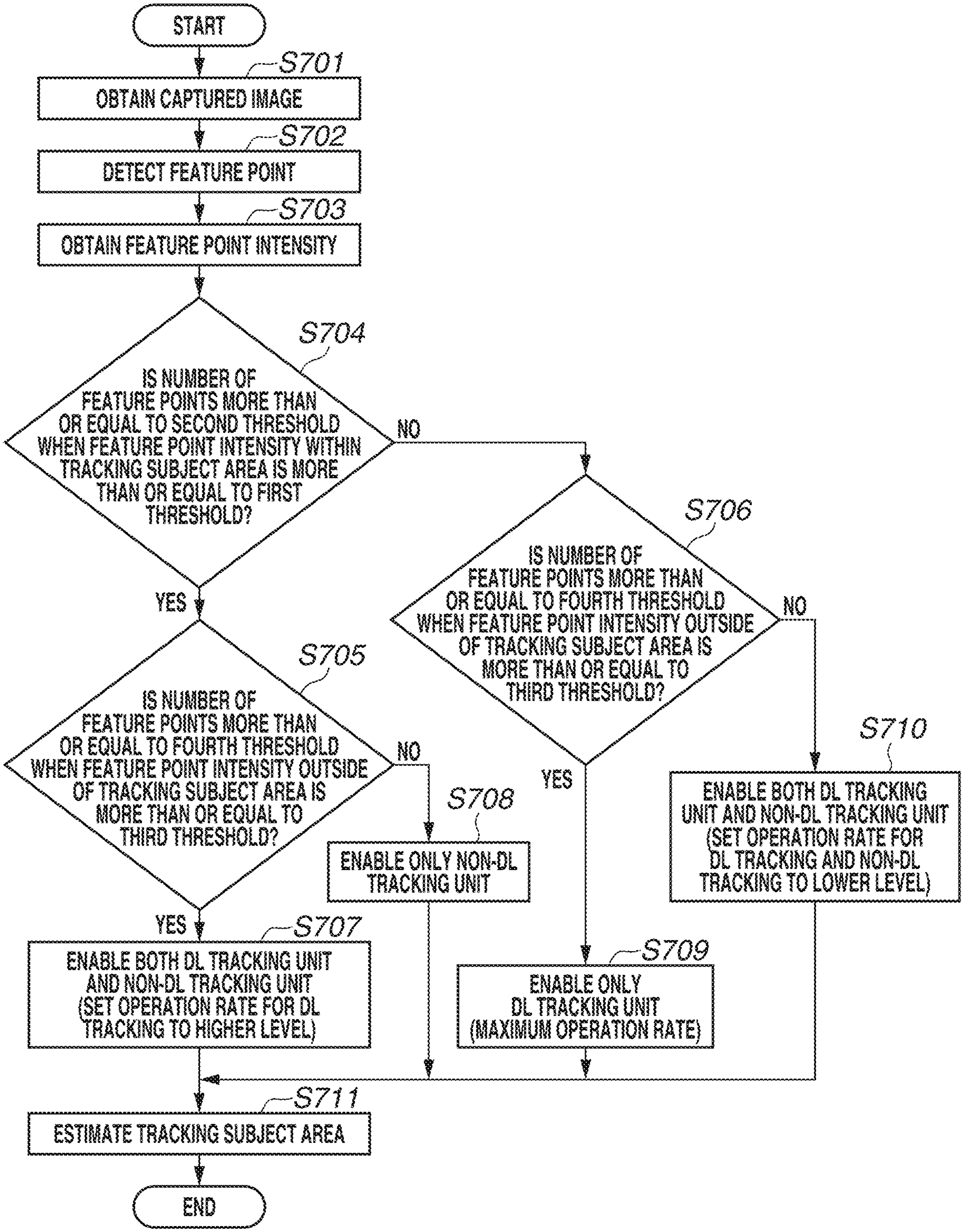
FIG. 7 is a flowchart illustrating an operation flow performed by the control unit according to a third exemplary embodiment.

FIG. 7 is a flowchart illustrating an operation flow performed by a control unit 102 according to the third exemplary embodiment. The processing flow is operated when an image capturing mode is selected from a menu in a state where the image capturing apparatus 100 is powered on, and a target tracking subject on which tracking processing is to be performed is determined in captured images sequentially obtained from the image sensor 103 to perform the tracking processing. In a case where tracking control ON/OFF settings are configured, the processing flow may be controlled to start when the tracking control is ON.

In step S701, the control unit 102 obtains a captured image that is output from the image sensor 103 or is stored in the detection/tracking memory 108.

In step S702, the evaluation value generation unit 124 analyzes the captured image obtained in step S701 and performs detection processing to detect a feature point from the image according to an instruction from the control unit 102. The feature point detection processing will be described in detail below.

In step S703, the control unit 102 obtains information about feature point intensity calculated when each feature point is detected in step S702.

In step S704, the control unit 102 performs determination processing on a feature point detected in a tracking subject area having been determined to be an area including the tracking target subject in the previous frame or before. Specifically, the control unit 102 determines whether the number of feature points is more than or equal to a second threshold when the feature point intensity within the tracking subject area is more than or equal to a first threshold. If the number of feature points is more than or equal to the second threshold when the feature point intensity is more than or equal to the first threshold (YES in step S704), the processing proceeds to step S705. If the number of feature points is less than the second threshold when the feature point intensity is more than or equal to the first threshold (NO in step S704), the processing proceeds to step S706.

In step S705, the control unit 102 performs determination processing on a feature point detected outside the area determined to be the tracking subject area in the previous frame within the captured image. Specifically, the control unit 102 determines whether the number of feature points is more than or equal to a fourth threshold when the feature point intensity outside of the tracking subject area is more than or equal to a third threshold. If the number of feature points is more than or equal to the fourth threshold when the feature point intensity is more than or equal to the third threshold (YES in step S705), the processing proceeds to step S707. If the number of feature points is less than the fourth threshold when the feature point intensity is more than or equal to the third threshold (NO in step S705), the processing proceeds to step S708.

In step S706, the control unit 102 performs determination processing on the feature point detected outside the area determined to be the tracking subject area in the previous frame within the captured image. Specifically, the control unit 102 determines whether the number of feature points is more than or equal to the fourth threshold when the feature point intensity outside of the tracking subject area is more than or equal to the third threshold. If the number of feature points is more than or equal to the fourth threshold when the feature point intensity is more than or equal to the third threshold (YES in step S706), the processing proceeds to step S709. If the number of feature points is less than the fourth threshold when the feature point intensity is more than or equal to the third threshold (NO in step S706), the processing proceeds to step S710.

In step S707, the tracking control unit 113 enables both the DL tracking unit 116 and the non-DL tracking unit 117 and sets an operation rate for DL tracking processing to be higher than the operation rate for non-DL tracking processing, according to an instruction from the control unit 102. Because there are many subjects with complicated texture on the inside and outside of the tracking subject area, which increases the difficulty of tracking, both the DL tracking processing and the non-DL tracking processing are performed at high rates to maintain tracking accuracy.

In step S708, the tracking control unit 113 disables the DL tracking unit 116 and enables the non-DL tracking unit 117 according to an instruction from the control unit 102. In the present exemplary embodiment, the operation rate for the non-DL tracking processing in this case is higher than the operation rate for the non-DL tracking processing set in step S707. Because the inside and outside of the tracking subject area can be easily distinguished, the tracking processing is performed using only the non-DL tracking, so that power consumption can be reduced while the tracking accuracy is maintained.

In step S709, the tracking control unit 113 enables the DL tracking unit 116 and disables the non-DL tracking unit 117 according to an instruction from the control unit 102. In the present exemplary embodiment, the operation rate for the DL tracking processing in this case is the highest among the operation rates for the DL tracking unit 116 set in steps S707 to S710. A situation where the number of feature points within the tracking subject area is smaller than the number of feature points outside of the tracking subject area increases the difficulty of tracking. Particularly, in the non-DL tracking processing in which the tracking processing is performed based on edge portions or the like within an image, as in the feature point detection processing, it is highly likely that an erroneous result is output. For this reason, tracking is performed using only the DL tracking processing to thereby prevent deterioration in the tracking accuracy.

In step S710, the tracking control unit 113 enables both the DL tracking unit 116 and the non-DL tracking unit 117, and sets the operation rate for each of the DL tracking processing and the non-DL tracking processing to be lower than the operation rate set in step S707, according to an instruction from the control unit 102. In a situation where only a small number of feature points can be detected on the inside and the outside of the tracking subject area, it is difficult to perform both the DL tracking processing and the non-DL tracking processing at higher accuracy. As a consequence, for example, results may fluctuate in various areas. If such results are applied at high rates, image flickering may be caused. Therefore, the operation rates are decreased while both the DL tracking processing and the non-DL tracking processing are enabled to prevent deterioration in visibility due to the flickering of the results of the tracking processing.

(Feature Point Detection Processing)

Figure 8:
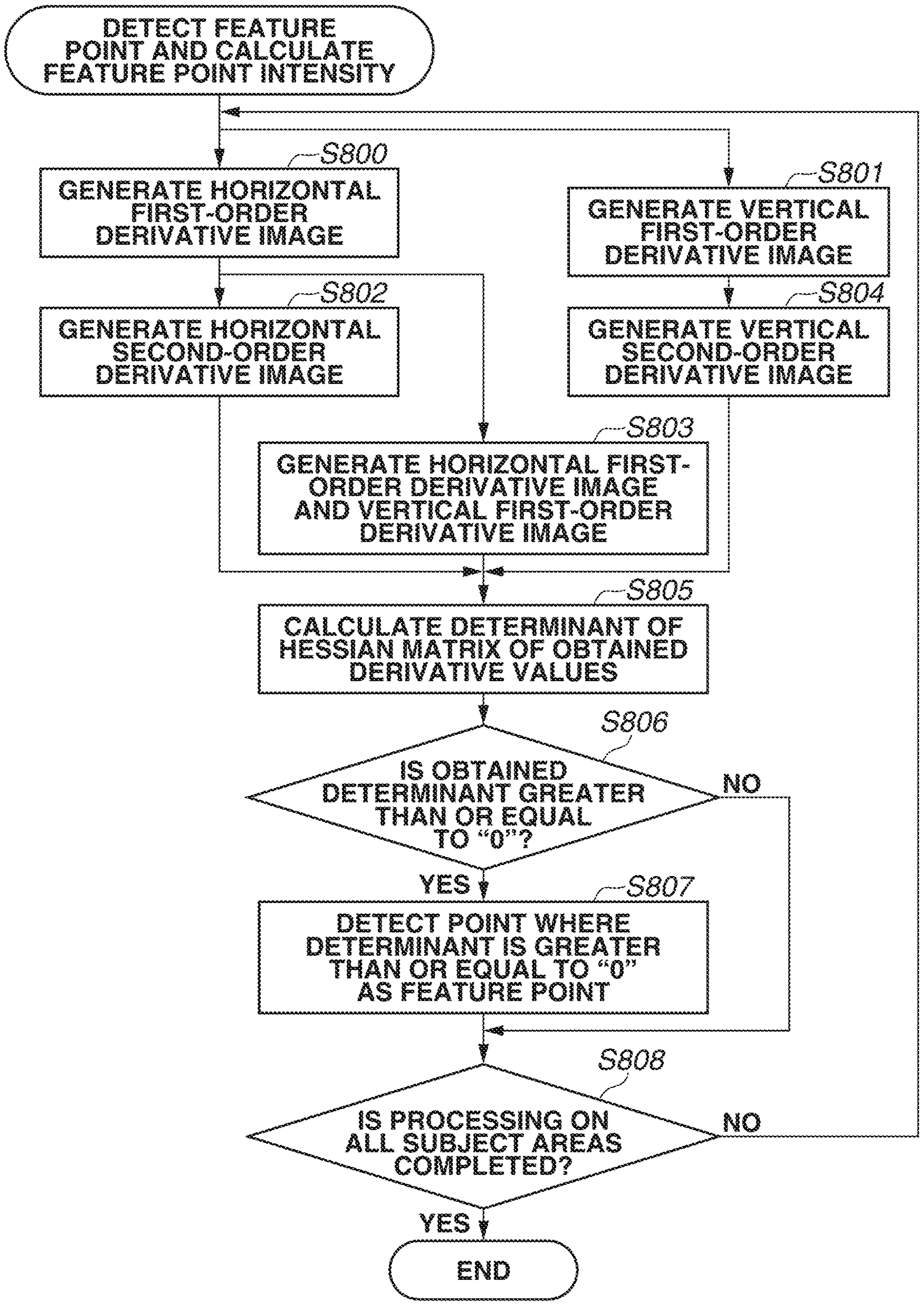
FIG. 8 is a flowchart illustrating feature point detection processing performed by a feature point detection unit according to the third exemplary embodiment.

FIG. 8 is a flowchart illustrating feature point detection processing performed by a feature point detection unit. In step S800, the control unit 102 performs horizontal first-order derivative filter processing on the tracking subject area to thereby generate a horizontal first-order derivative image. In step S802, the control unit 102 further performs horizontal first-order derivative filter processing on the horizontal first-order derivative image obtained in step S800 to thereby generate a horizontal second-order derivative image.

In step S801, the control unit 102 performs vertical first-order derivative filter processing on the tracking subject area to thereby generate a vertical first-order derivative image.

In step S804, the control unit 102 further performs vertical first-order derivative filter processing on the vertical first-order derivative image obtained in step S801 to thereby generate a horizontal second-order derivative image.

In step S803, the control unit 102 further performs vertical first-order derivative filter processing on the horizontal first-order derivative image obtained in step S800 to thereby generate a horizontal first-order derivative image and a vertical first-order derivative image.

In step S805, the control unit 102 calculates a determinant Det of a Hessian matrix H of derivative values obtained in steps S802, S803, and S804. Where the horizontal second-order derivative value obtained in step S802 is represented by $L_{xx}$, the vertical second-order derivative value obtained in step S804 is represented by $L_{yy}$, and the horizontal first-order derivative value and the vertical first-order derivative value obtained in step S803 are each represented by $L_{xy}$, the Hessian matrix H is expressed by a formula (1) and the determinant Det is expressed by a formula (2).

$$H = \begin{bmatrix} L_{xx} & L_{xy} \\ L_{xy} & L_{yy} \end{bmatrix} \quad (1)$$

$$\text{Det} = L_{xx} * L_{yy} - L_{xy}^2 \quad (2)$$

In step S806, the control unit 102 determines whether the determinant Det obtained in step S805 is greater than or equal to "0". If the determinant Det is greater than or equal to "0" (YES in step S806), the processing proceeds to step S807. If the determinant Det is less than "0" (NO in step S806), the processing proceeds to step S808.

In step S807, the control unit 102 detects a point where the determinant Det is more than or equal to "0" as a feature point.

In step S808, if the control unit 102 determines that the processing on all input subject areas is completed (YES in step S808), the feature point detection processing ends. If the processing on all the input subject areas is not completed (NO in step S808), the processing of steps S800 to S807 is repeated to continuously perform the feature point detection processing.

As described above, in the present exemplary embodiment, the image processing apparatus using the first tracking unit and the second tracking unit with a smaller operational load than the operational load in the first tracking unit controls enabling or disabling the first tracking unit and the second tracking unit based on the feature amount of an image. Consequently, power consumption can be suppressed in a scene in which there is less need for obtaining an excellent tracking result.

The present invention has been specifically described above with reference to the exemplary embodiments. However, the present invention is not limited to the exemplary embodiments, and various modifications can be made without departing from the gist of the present invention.

The present invention is not limited to the exemplary embodiments described above, and various modifications and alterations can be made without departing from the spirit and scope of the present invention. Accordingly, the following claims are attached to publicize the scope of the present invention.

This application claims the benefit of Japanese Patent Application No. 2021-200668, filed Dec. 10, 2021, which is hereby incorporated by reference herein in its entirety.

According to an aspect of the present invention, it is possible to implement a subject tracking function to achieve an excellent performance while reducing power consumption.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising:

a first tracking unit configured to perform subject tracking using an image obtained by an image capturing unit;

a second tracking unit configured to perform subject tracking using the image obtained by the image capturing unit, an operational load in the second tracking unit being smaller than an operational load in the first tracking unit; and a control unit configured to control switching between enabling both the first tracking unit and the second tracking unit and disabling one of the first tracking unit and the second tracking unit based on brightness of the image obtained by the image capturing unit.

2. The image processing apparatus according to claim 1, wherein, in a case where the brightness is lower than a reference, the control unit disables the first tracking unit and enables the second tracking unit.

3. The image processing apparatus according to claim 1, wherein the control unit controls switching between enabling both the first tracking unit and the second tracking unit and disabling one of the first tracking unit and the second tracking unit based on a result of comparing the brightness of the image among a plurality of frames.

4. An image processing method comprising:

performing a first tracking for tracking a subject using an image obtained by an image capturing unit;

performing a second tracking for tracking the subject using the image obtained by the image capturing unit, an operational load in the second tracking being smaller than an operational load in the first tracking; and controlling switching between enabling both the first tracking and the second tracking and disabling one of the first tracking and the second tracking based on brightness of the image obtained by the image capturing unit.

* * * * *